United States Patent Office 3,129,203
Patented Apr. 14, 1964

3,129,203
RESINS PREPARED FROM TERPENE OXYDATES
AND MALEIC ANHYDRIDE
Fred W. Muncie, Lake Wales, Fla., assignor to Suni-Citrus
Products Company, Haines City, Fla., a corporation of
Florida
No Drawing. Filed Feb. 8, 1960, Ser. No. 7,122
4 Claims. (Cl. 260—78.5)

This invention relates to resins prepared from terpene oxydates and maleic anhydride and to methods for their production.

Limonene is obtained in substantial quantities along with lesser amounts of related terpenes as a by-product of the citrus fruit industry. Thus, essential oils obtained by solvent extraction or other methods from citrus peel or pulp are composed principally of limonene. Although a number of commercially important uses exist for limonene, the supply of this commodity often exceeds the demand and additional commercial uses for the product are needed. Moreover, commerce in limonene and citrus oils containing it in substantial quantities are complicated by the tendency for limonene to absorb oxygen. This oxygen absorption process takes place at an appreciable rate, even at room temperature. The oxygen absorption reaction apparently involves the initial formation of one or more hydroperoxides of limonene, followed by secondary reactions which result in formation of oxygenated compounds of epoxy and hydroxy structure. At the same time polymers are formed in considerable quantity; these are of unknown constitution, possibly the dimer and trimer of limonene, possibly oxygenated and polymerized compounds. The oxidation reaction is most rapid at the beginning and becomes progressively slower as it proceeds, not only due to the effects of the laws of mass action as the concentration of limonene decreases in the reaction mixture, but also because the oxygenated products appear to act as anti-oxidants, thus slowing down the reaction. In commercial practice, it is not practical to convert more than about 60% by weight of limonene into oxygenated products, leaving about 40% of unchanged limonene in the oxygenated mixture. The oxydized limonene consisting of epoxy and and hydroxy structure oxygenated compounds is referred to as limonene oxydate and the oxygenated mixtures which are obtained by limonene or oils containing the same are referred to as limonene-limonene oxydate mixtures.

One commercial use which has been developed as an outlet for the sale of limonene involves its reaction with maleic anhydride and use of the adduct in the formation of thermoplastic resins. Although limonene contains no conjugated system of double bonds, it reacts with maleic anhydride, in the absence of maleic acid, to form adducts which are known in the trade as Petrex acids (see "Encyclopedia of Chemical Technology," vol. I, page 527). These Petrex acids have been reacted in the past with polyhydroxy compounds such as glycerine and glycols to give alkyd resins.

A principal object of this invention is the provision of new improvements in resins and in processes for obtaining resins. Further objects include:

(1) The provision of new, improved resins made from limonene oxydate mixtures and maleic anhydride.

(2) The provision of new resins which may be manufactured and sold at a relatively low price and which create an expanded market for the utilization of citrus waste oils and the terpenes of which such oils are composed.

(3) The provision of new uses for partially oxidized terpenes and specifically limonene oxydates.

(4) The provision of new thermoplastic alcohol-soluble resins which are relatively inexpensive and which may be used in the formation of coating compositions, adhesives, inks, binder materials and the like.

(5) The provision of processes for the manufacture of thermoplastic resins which involve only a few simple, easily conducted steps, and which utilize readily attainable mixtures of limonene oxydate and limonene, without requiring the subjection of such mixtures to costly separation procedures or the like.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

These objects are accomplished according to the present invention by procedures which broadly comprise oxidation of terpenes to form mixtures comprising terpene oxydates and terpenes, reaction of maleic anhydride with the resulting terpene oxydate mixtures, and recovery of the resulting thermoplastic resinous reaction products. Specifically, the invention comprises passing of oxygen through limonene, either in relatively pure form or in the crude forms in which it is obtained in citrus waste oils, until the oxidation reaction will no longer proceed at a practical rate, mixing with the resulting oxidation mixture of limonene and limonene oxydate between about 30 to 40% by weight of maleic anhydride, heating the admixture to an elevated temperature, preferably to reflux at atmospheric pressure, until reaction ceases, e.g., at least about two hours at reflux temperature, removing unreacted volatile material from the reaction mixture, and

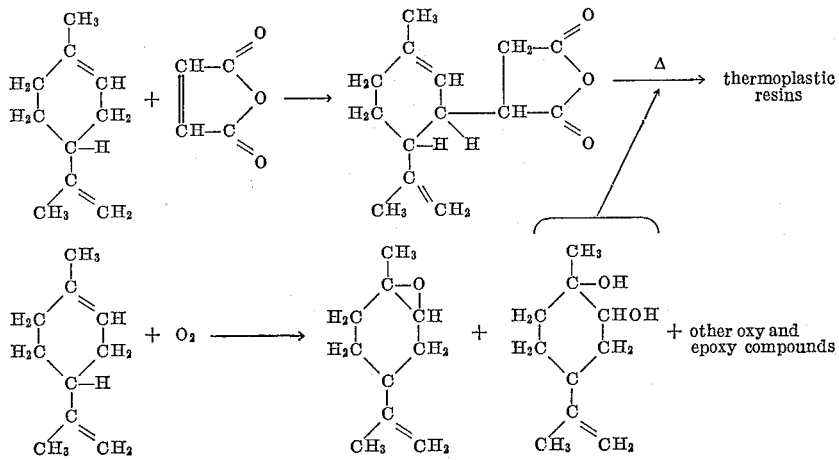

then recovering the resulting thermoplastic, alcohol-soluble resin. The series of steps involved in the new resin forming operations may be illustrated by the preceding equations:

These foregoing equations are given to illustrate what partially may occur in the resin formation. The composition of limonene oxydate is not known with certainty, however, and the reactions may be much more complex. The resin can be best characterized by the ingredients used and the method of its preparation.

A more complete understanding of the invention may be obtained from the following example of operation in accordance with the invention. In the example, all parts and percentages are by weight, all temperatures are in ° C., and all optical measurements are by angular rotation at 25° C. using a 100 mm. tube and expressed in degrees of rotation.

Four liters of d-limonene recovered by steam distillation of citrus waste are charged into a vessel equipped with means for heating and for gas diffusion through the liquid content. The limonene is heated to a temperature of 60° and air is diffused through it at a moderate rate.

The initial optical rotation of the oil is +98.5°. Progress of the reaction is followed by optical rotation measurements and aeration is continued until the rotation has dropped to 40°. From the mixture, about 40% is removed by distillation and the distillate is found to have a rotation close to the original indicating the presence of about 40% substantially unchanged limonene. Acetylation using acetic anhydride and sodium acetate indicated the presence of somewhat more than 2 OH groups per mol. of the limonene reacted upon.

To this limonene oxydate mixture are added 35 parts of maleic anhydride and the mixture is heated under reflux. Reaction starts at 140°, becomes vigorous at 160° and reflux occurs at 170°. Heating at this temperature is maintained for two hours and progress of the reaction followed by periodic sampling through the stage of a viscous waxy liquid to a waxy resin that balls between the fingers. Vacuum is then applied and a small amount of volatile liquid removed. The resin is then poured into cooling pans where it solidifies quickly to a high melting waxy resin, bright red in color and completely soluble in 10 parts of ethyl alcohol. An alcohol solution of the resin can be incorporated in nitrocellulose formulations, with which it is compatible. The resin is tough but can be fractured by impact at 10° C. or below.

Various terpene oxydates may be used in the preparation of thermoplastic resins in accordance with this invention, although limonene is the preferred terpene because of availability and the desired properties, e.g., toughness, which are obtained in the final thermoplastic resins made from limonene oxydate. Oxydates of other terpenes such as α-pinene and terpinolene may be employed in the production of thermoplastic resins in accordance with the invention. Terpene oxidation mixtures containing 30 to 70% terpene oxydate and 70 to 30% by weight unreacted terpene are usable. The partial oxidation of the terpene preferably should be carried out to an extent where the resulting terpene oxidation mixture contains at least about 50% by weight of terpene oxydate, but at least about 20% by weight of unreacted terpene.

The exact chemical composition of the resins produced in accordance with this invention is not known with certainty. As indicated, the oxidized terpene materials contain a substantial amount of unreacted terpene. For example, oxidized limonene with a rotation of +40° when subjected to distillation at atmospheric pressure, gives a distillate boiling at about 170–180° C., which amounts to approximately 40% by weight of the oxidation product, and this distillate has the optical rotation normal for limonene. When maleic anhydride is added to the oxidation mixture of limonene and limonene oxydate, there is a gradual disappearance of free limonene in the mixture on continued heating. This is characteristic of the gradual formation of an adduct of limonene and maleic anhydride, and the maleic anhydride required for reaction with the limonene-limonene oxydate mixture has been found to approximate that calculated for an adduct. Excess of maleic anhydride which may be added to the oxidation material has been observed to remain unreacted. On the other hand, when insufficient maleic anhydride is added to the oxidation material to form an adduct with all unreacted terpene, the terpene present in the oxidation material in excess of that required to form an adduct is removed by subsequent vacuum or steam distillation. The composition of the polymer formed during the oxidation is not known and it contributes to the final properties of the new thermoplastic resins produced according to this invention. With a limonene-limonene oxydate mixture comprising 50 to 60% limonene oxydate and 40 to 50% by weight limonene, between about 20 to 35% by weight of maleic anhydride, based on the total weight of oxydate mixture may be admixed in carrying out the resin forming step.

Regardless of the exact chemical reactions involved in the final chemical composition of the resulting thermoplastic resin, the new process of the invention make possible the production of useful thermoplastic resins at relatively very low cost. This derives from the fact that low priced citrus waste oils may be used as one of the essential starting reactants and the formation of the final resin involves only the simple aeration, anhydride addition and volatile removal steps. There is no need to recover or purify intermediate products and the procedure can be conducted at one location with relatively simple apparatus.

The terpene oxydate may be prepared by aeration of citrus waste oil or chemically pure limonene or other equivalent terpene or terpene mixtures using air or oxygen. The oxidation step may be conducted at ambient temperature, but elevated temperatures are preferred, e.g., the oxidation may be carried out at between 20° and reflux temperature, and preferably at about 40 to 100° C. A catalyst may be used in the oxidation reaction if desired, but this is not recommended because the oxidation reaction proceeds well enough without catalysts and their use presents problems of contamination of the final thermoplastic resins. The progress of the oxidation reaction may be followed, if desired, by observing increase in weight or by drop in optical rotation of the reaction mixture. In practice, the terpene may be aerated until 1 to 1.5 mols of oxygen per mol of terpene has combined, but it is preferred to aerate limonene to a final optical rotation of about +35° to +40°, since this has been found to provide an oxidation material having the most advantageous proportion of limonene and limonene oxydate to produce final thermoplastic resins of superior properties.

Have provided a complete description of the invention in such manner as to distinguish it from other inventions and from what is old, and having provided a description of the best mode contemplated of carrying out the invention, the scope of patent protection to be granted to the invention is defined by the following claims.

I claim:
1. A process for the production of thermoplastic, alcohol-soluble resins which comprises passing oxygen through a bath of limonene at a temperature of about 40° to 100° C. until the optical rotation of the resulting mixture of limonene and limonene oxydate is between about +35° and +40°, mixing between about 30 to 40% by weight of maleic anhydride with said limonene oxydate mixture, heating the resulting mixture to reflux for at least about two hours, removing unreacted volatile material and recovering the resulting thermoplastic, alcohol-soluble resin.

2. A thermoplastic, alcohol-soluble resin produced by reaction of maleic anhydride and limonene oxydate, said limonene oxydate being a liquid oxidation product of limonene having an optical rotation between about +35° and +40° formed by passing oxygen through a bath of limonene at a temperature of about 40° to 100° C. until a product of said optical rotation is obtained.

3. A thermoplastic, alcohol-soluble resin produced by reaction of about 30 to 40% by weight of maleic anhydride, with about 60 to 70% by weight of limonene oxydate, said limonene oxydate being a liquid oxidation product of limonene having an optical rotation between about +35° and +40° formed by passing oxygen through a bath of limonene at a temperature of about 40° to 100° C. until a product of said optical rotation is obtained.

4. A process for the production of thermoplastic, alcohol-soluble resin which comprises aerating limonene at a temperature of about 40° to 100° C. until it has reacted with between about 1 and 1.5 mols of oxygen per mol of limonene forming limonene oxydate, mixing maleic anhydride with the limonene oxydate, heating the resulting mixture to reflux for at least about two hours, and recovering thermoplastic, alcohol-soluble resin from the reaction mixture.

References Cited in the file of this patent

UNITED STATES PATENTS

| | | |
|---|---|---|
| 2,063,837 | Bruson | Dec. 8, 1936 |
| 2,383,791 | Harvey | Aug. 28, 1945 |
| 2,634,256 | Sparks et al. | Apr. 7, 1953 |
| 2,829,130 | Greenspan et al. | Apr. 1, 1958 |
| 2,863,882 | Bain et al. | Dec. 9, 1958 |
| 2,911,442 | Bain et al. | Nov. 3, 1959 |
| 2,945,068 | Booth | July 12, 1960 |

FOREIGN PATENTS

| | | |
|---|---|---|
| 518,057 | France | Feb. 15, 1940 |